United States Patent
Yasumatsu (10) Patent No.: US 10,534,248 B2
(45) Date of Patent: Jan. 14, 2020

(54) LIGHT SOURCE DEVICE AND PROJECTOR

(71) Applicant: SEIKO EPSON CORPORATION, Tokyo (JP)

(72) Inventor: Wataru Yasumatsu, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/043,613

(22) Filed: Jul. 24, 2018

(65) Prior Publication Data

US 2019/0041737 A1   Feb. 7, 2019

(30) Foreign Application Priority Data

Aug. 1, 2017  (JP) .................... 2017-148903

(51) Int. Cl.
*G03B 21/20*   (2006.01)

(52) U.S. Cl.
CPC ....... *G03B 21/2053* (2013.01); *G03B 21/204* (2013.01); *G03B 21/208* (2013.01); *G03B 21/2073* (2013.01); *G03B 21/2093* (2013.01)

(58) Field of Classification Search
CPC .......... G03B 21/204; G03B 21/2053; G03B 21/208; G03B 21/2093; G03B 21/2073; G03B 33/12; H04N 9/3152; H04N 9/3161
See application file for complete search history.

(56) References Cited

U.S. PATENT DOCUMENTS

| | | | | |
|---|---|---|---|---|
| 7,967,452 B2 * | 6/2011 | Itoh | ................ | G03B 21/14 353/119 |
| 8,733,957 B2 * | 5/2014 | Takahashi | ............... | F21S 41/14 362/84 |
| 2012/0206695 A1 * | 8/2012 | Olsen | ............... | G03B 21/208 353/30 |
| 2014/0146291 A1 | 5/2014 | Kawamura et al. | | |
| 2014/0268063 A1 * | 9/2014 | Akiyama | ............. | G03B 21/204 353/20 |
| 2016/0062221 A1 * | 3/2016 | Matsubara | ......... | G03B 21/2013 353/31 |

FOREIGN PATENT DOCUMENTS

| | | |
|---|---|---|
| JP | 2014-106452 A | 6/2014 |
| JP | 2016-186523 A | 10/2016 |

\* cited by examiner

*Primary Examiner* — Peggy A Neils
(74) *Attorney, Agent, or Firm* — Oliff PLC (57) ABSTRACT

A light source device includes a light source, a homogenizer optical system provided with a first multi-lens array having a plurality of first lenses which light emitted from the light source enters, and a second multi-lens array having a plurality of second lenses each of which the light having been transmitted through corresponding one of the first lenses enters, and adapted to homogenize the light emitted from the light source, a light intensity control element adapted to control light intensity of the light emitted from the homogenizer optical system, a light collection optical system adapted to converge the light having been transmitted through the light intensity control element, and a diffusion element which the light converged by the light collection optical system enters.

20 Claims, 4 Drawing Sheets

LIGHT SOURCE DEVICE AND PROJECTOR

BACKGROUND

1. Technical Field

The present invention relates to a light source device and a projector.

2. Related Art

In JP-A-2016-186523, there is disclosed an illumination device for homogenizing an illuminance distribution of excitation light emitted from a semiconductor laser using a homogenizer optical system formed of a pair of multi-lens arrays, and then making the excitation light enter the wavelength conversion element. In such an illumination device, the pair of multi-lens arrays of the homogenizer optical system are formed of pluralities of small lenses corresponding one-to-one to each other.

In the related-art structure, the excitation light emitted from the semiconductor laser enters a position shifted from the wavelength conversion element in some cases due to a factor such as a variation in the implementation accuracy. More specifically, the light which has been emitted from a small lens of one of the multi-lens arrays, and then entered a small lens of the other of the multi-lens arrays not corresponding to the small lens of the one of the multi-lens arrays enters the position shifted from the incident area of the excitation light in the wavelength conversion element in some cases. There is a possibility that the excitation light shifted from the incident area of the wavelength conversion element turns to the stray light to damage other components such as a light guide. Further, in the case in which the wavelength conversion element is fixed to a support member with a bonding layer, there is a possibility that the excitation light enters the bonding layer disposed in the periphery of the wavelength conversion element to incur deterioration of the bonding layer.

SUMMARY

An advantage of some aspects of the invention is to provide a light source device in which stray light is blocked to prevent the stray light from damaging other members. Another advantage of some aspects of the invention is to provide a projector equipped with the light source device described above.

A light source device according to an aspect of the invention includes a light source, a homogenizer optical system provided with a first multi-lens array having a plurality of first lenses which light emitted from the light source enters, and a second multi-lens array having a plurality of second lenses each of which the light having been transmitted through corresponding one of the first lenses enters, and adapted to homogenize the light emitted from the light source, a light intensity control element adapted to control light intensity of the light emitted from the homogenizer optical system, a light collection optical system adapted to converge the light having been transmitted through the light intensity control element, and a diffusion element which the light converged by the light collection optical system enters.

In the configuration described above, the homogenizer optical system is provided with the first multi-lens array having the plurality of first lenses, and the second multi-lens array having the plurality of second lenses each of which the light having been transmitted through corresponding one of the first lenses enters. In other words, the first lenses and the second lenses correspond one-to-one to each other. Therefore, there is a possibility that in the homogenizing process of the light by the homogenizer optical system, the light which is emitted from the first lens in the first multi-lens array and then enters the second lens of the second multi-lens array not corresponding to that first lens becomes stray light. According to the configuration described above, by disposing the light intensity control element between the homogenizer optical system and the light collection optical system, it is possible to block the stray light generated in the homogenizing process of the light with the light intensity control element to prevent the stray light from entering other members. More specifically, it is possible to prevent the stray light from entering an area other than the light collection area, in which the light collection is performed by the light collection optical system, and which is formed on the surface of the diffusion element. Therefore, in the case in which the diffusion layer of the diffusion element is fixed with the bonding layer, it is possible to prevent the stray light from entering the bonding layer disposed on the periphery (the outer circumference of the diffusion layer) of the diffusion layer, and thus it is possible to prevent the deterioration of the bonding layer. Therefore, according to the configuration described above, it is possible to provide a light source device which blocks the stray light to thereby prevent the stray light from damaging other members.

In general, it is preferable to dispose the light collection optical system and the diffusion layer of the diffusion element as close as possible to each other. In particular, in the case in which the diffusion element diffuses the incident light while reflecting the incident light, in order to make the light having been diffused and reflected by the diffusion element enter the light collection optical system as much as possible, it is preferable to set the gap between the light collection optical system and the diffusion element in a range of, for example, 1 mm through 2 mm, and in such a case, it is difficult to dispose the light intensity control element between the light collection optical system and the diffusion element. According to the configuration described above, by disposed the light intensity control element between the homogenizer optical system and the light collection optical system, it is possible to prevent the stray light from entering an area in the diffusion element other than the area which the light converged by the light collection optical system enters while narrowing the gap between the light collection optical system and the light intensity control element to prevent the light emitted from the diffusion element from failing to enter the light collection optical system.

It should be noted that as the diffusion element, it is possible to adopt a wavelength conversion element for diffusing the light while converting the wavelength of the incident light, or a diffusion plate (a diffusely reflecting element) for reflecting or transmitting the incident light while diffusing the incident light.

The light source device according to the aspect of the invention may be configured such that the diffusion element has a diffusion layer adapted to diffuse incident light, a support member adapted to support the diffusion layer, and a bonding layer adapted to bond the diffusion layer and the support member to each other.

According to the configuration described above, it is possible to realize the diffusion element having the diffusion layer fixed to the support member. Further, in the case of using such a diffusion element, since it is possible to prevent the light from entering the bonding layer by using the light intensity control element, there is no chance of deteriorating the bonding layer, and it is possible to enhance the reliability in holding the diffusion layer.

The light source device according to the aspect of the invention may be configured such that the light intensity control element has a main body part provided with an opening part, and the light intensity control element blocks a part of the light with the main body part while transmitting a part of the light through the opening part to control the light intensity.

According to the configuration described above, it is possible to make only the light having passed through the opening part enter the diffusion layer of the diffusion element. Further, it is possible to block the light which is going to enter the outside of the diffusion layer with the main body part. It should be noted here that the opening part is only required to provide an area for transmitting the light in the case of viewing the light intensity control element along the optical axis direction. Further, it is also possible for the main body part to be constituted by a plurality of members.

The light source device according to the aspect of the invention may be configured such that the light source device further includes a superimposing optical system located between the homogenizer optical system and the light intensity control element and adapted to superimpose the light emitted from the homogenizer optical system on the opening part of the light intensity control element.

According to the configuration described above, by disposing the superimposing optical system in the posterior stage of the homogenizer, it is possible to superimpose the light beams divided into by the multi-lens array on each other. Thus, it is possible to form an area having a similarity shape to the area in which the light collection is performed on the diffusion layer of the diffusion element by the light collection optical system. By making this area coincide with the opening part of the light intensity control element, it is possible to block the light which is going to enter an area outside the diffusion layer with the main body part of the light intensity control element.

It should be noted that it is preferable to provide the opening part of the light intensity control element with a similarity shape to the shape of the diffusion layer. Further, in order to make the light emitted from the light source enter the diffusion layer as much as possible (i.e., to improve the efficiency of the light), it is preferable for the shape of the opening part to be a similarity shape to the first lens of the first lens array.

Further, it is preferable for the opening part of the light intensity control element and the diffusion layer of the diffusion element to be arranged so as to have a conjugate relation. Further, it is preferable for the opening part of the light intensity control element to be arranged so as to have a conjugate relation with the first lens array in order to improve the efficiency of the light.

The light source device according to the aspect of the invention may be configured such that the light source device further includes a collimator optical system located between the light intensity control element and the light collection optical system and adapted to collimate the light having been transmitted through the light intensity control element.

According to the configuration described above, the collimator optical system is disposed in the posterior stage of the light intensity control element in the configuration in which the superimposing optical system is provided. Thus, since it is possible to collimate or roughly collimate the light which is converged by the superimposing optical system and is then diffused, and then make the light enter the light collection optical system, it is possible to miniaturize the light collection optical system. It should be noted here that roughly collimating the light means converting the light passing therethrough into roughly parallel light. Further, roughly parallel light means the light in the state in which the angle formed between the light beams constituting the light is sufficiently small.

The light source device according to the aspect of the invention may be configured such that the superimposing optical system is formed of an aspherical lens.

According to the configuration described above, since the superimposing optical system is formed of the aspherical lens, it is possible to form a superimposed area having a top-hat distribution using the superimposing optical system to improve the efficiency of the light.

The light source device according to the aspect of the invention may be configured such that the main body part of the light intensity control element absorbs the incident light.

According to the configuration described above, since the main body part absorbs the incident light, it is possible to prevent the light blocked by the light intensity control element from becoming the stray light inside the light source device.

The light source device according to the aspect of the invention may be configured such that the main body part of the light intensity control element reflects the incident light, and the light intensity control element has a light receiving body adapted to absorb the light reflected by the main body part.

According to the configuration described above, since the main body part reflects the incident light, and further the light receiving body absorbs the reflected light, it is possible to prevent the light blocked by the light intensity control element from becoming the stray light inside the light source device.

The light source device according to the aspect of the invention may be configured such that the diffusion element is formed of a wavelength conversion element adapted to convert a wavelength of the light emitted from the light source.

According to the configuration described above, it is possible to prevent the light from entering an area other than the incident area of the wavelength conversion element. In the case in which the wavelength conversion element is used as the diffusion element, and the diffusion element is fixed with the bonding layer, it is possible to prevent the stray light from entering the bonding layer disposed on the periphery (the outer circumference of the diffusion layer) of the diffusion layer, and thus it is possible to prevent detachment of the wavelength conversion element as a result.

A projector according to another aspect of the invention includes the light source device according to the aspect of the invention, a light modulation device adapted to modulate light emitted from the illumination device in accordance with image information to thereby form image light, and a projection optical system adapted to project the image light.

According to the configuration described above, since the light source device according to the aspect of the invention is provided, it is possible to provide a projector which blocks the stray light to thereby prevent the stray light from damaging other members.

BRIEF DESCRIPTION OF THE DRAWINGS

The invention will be described with reference to the accompanying drawings, wherein like numbers reference like elements.

DESCRIPTION OF EXEMPLARY EMBODIMENTS

Some embodiments of the invention will hereinafter be described in detail with reference to the drawings.

It should be noted that the drawings used in the following description show characteristic parts in an enlarged manner in some cases for the sake of convenience in order to make the features easy to understand, and the dimensional ratios between the constituents and so on are not necessarily the same as actual ones.

First Embodiment

Firstly, an example of a projector 1 according to the present embodiment will be described.

Figure 1:
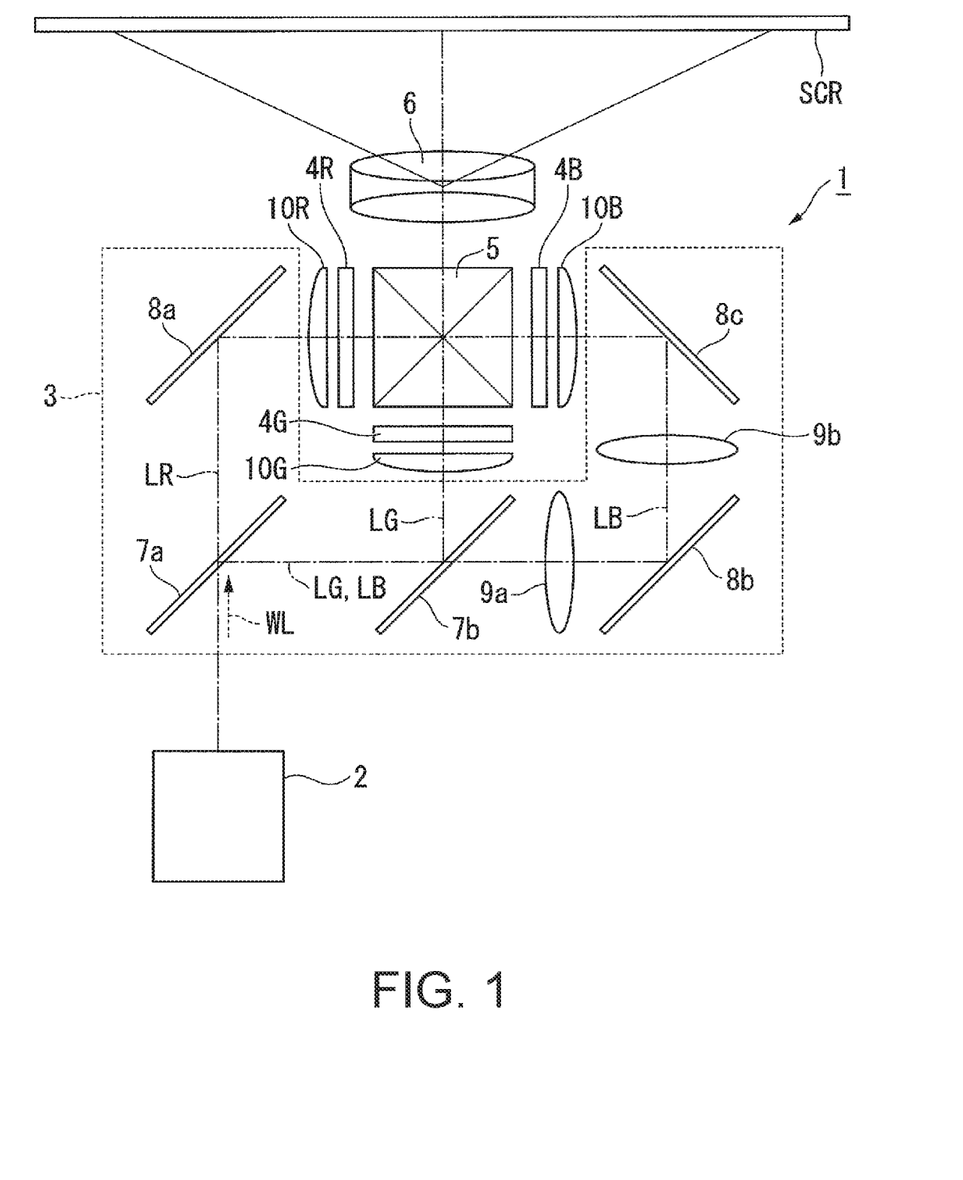
FIG. 1 is a diagram showing a schematic configuration of a projector according to a first embodiment of the invention.

FIG. 1 is a diagram showing a schematic configuration of the projector 1 according to the present embodiment.

As shown in FIG. 1, the projector 1 according to the present embodiment is a projection-type image display device for displaying a color picture on a screen SCR. The projector 1 is provided with an illumination device 2, a color separation optical system 3, a light modulation device 4R, a light modulation device 4G, a light modulation device 4B, a combining optical system 5, and a projection optical system 6.

The color separation optical system 3 separates illumination light WL into red light LR, green light LG, and blue light LB. The color separation optical system 3 is provided with a first dichroic mirror 7a and a second dichroic mirror 7b, a first total reflection mirror 8a, a second total reflection mirror 8b, and a third total reflection mirror 8c, and a first relay lens 9a and a second relay lens 9b.

The first dichroic mirror 7a separates the illumination light WL from the illumination device 2 into the red light LR and the other light (the green light LG and the blue light LB). The first dichroic mirror 7a transmits the red light LR thus separated from, and at the same time reflects the rest of the light. The second dichroic mirror 7b reflects the green light LG, and at the same time transmits the blue light LB.

The first total reflection mirror 8a reflects the red light LR toward the light modulation device 4R. The second total reflection mirror 8b and the third total reflection mirror 8c guide the blue light LB to the light modulation device 4B. The green light LG is reflected from the second dichroic mirror 7b toward the light modulation device 4G.

The first relay lens 9a and the second relay lens 9b are disposed in a posterior stage of the second dichroic mirror 7b in the light path of the blue light LB.

The light modulation device 4R modulates the red light LR in accordance with image information to form red image light. The light modulation device 4G modulates the green light LG in accordance with the image information to form green image light. The light modulation device 4B modulates the blue light LB in accordance with the image information to form blue image light.

As the light modulation device 4R, the light modulation device 4G, and the light modulation device 4B, there are used, for example, transmissive liquid crystal panels. Further, on the incident side and the exit side of each of the liquid crystal panels, there are respectively disposed polarization plates (not shown).

Further, on the incident side of the light modulation device 4R, the light modulation device 4G, and the light modulation device 4B, there are disposed a field lens 10R, a field lens 10G, and a field lens 10B, respectively.

The image light from each of the light modulation device 4R, the light modulation device 4G, and the light modulation device 4B enters the combining optical system 5. The combining optical system 5 combines the image light, and then emits the image light thus combined toward the projection optical system 6. As the combining optical system 5, there is used, for example, a cross dichroic prism.

The projection optical system 6 is formed of a projection lens group, and projects the image light combined by the combining optical system 5 toward the screen SCR in an enlarged manner. Thus, the color picture enlarged is displayed on the screen SCR.

Illumination Device

Figure 2:
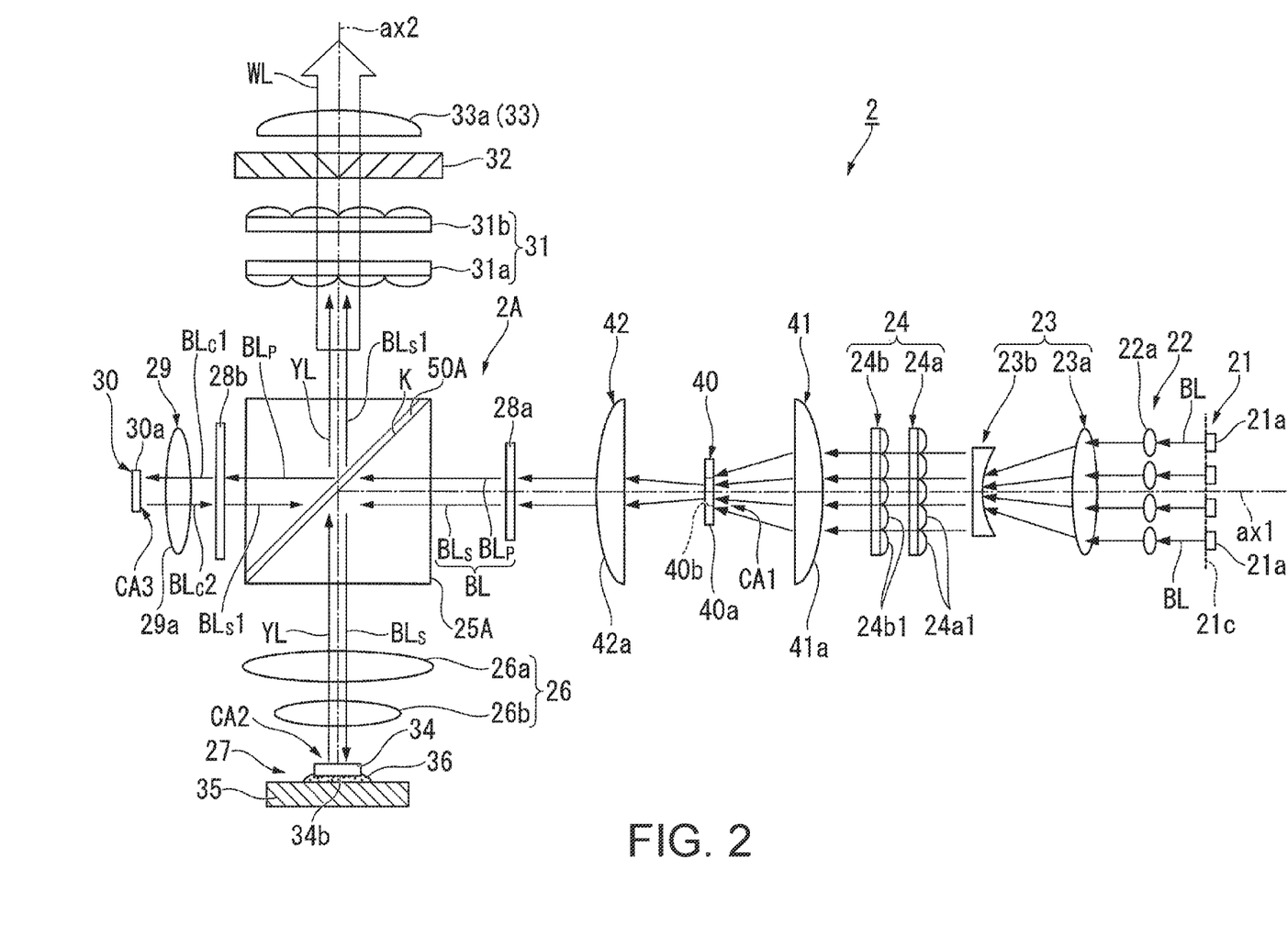
FIG. 2 is a diagram showing a schematic configuration of an illumination device according to the first embodiment.

Then, an illumination device 2 according to an embodiment of the invention will be described. FIG. 2 is a diagram showing a schematic configuration of the illumination device 2. As shown in FIG. 2, the illumination device 2 is provided with a light source device 2A, an integrator optical system 31, a polarization conversion element 32, and an superimposing lens 33a. In the present embodiment, the integrator optical system 31 and the superimposing lens 33a constitute an illumination device superimposing optical system 33.

The light source device 2A is provided with an array light source 21, a collimator optical system 22, an afocal optical system 23, a homogenizer optical system 24, a superimposing optical system 41, a light intensity control element 40, a collimator optical system 42, a first wave plate 28a, an optical element 25A including a polarization separation element 50A, a first light collection optical system (a light collection optical system) 26, a wavelength conversion element (a diffusion element) 27, a second wave plate 28b, a second light collection optical system (a light collection optical system) 29, and a diffusely reflecting element (a diffusion element) 30.

It should be noted that in the present embodiment the wavelength conversion element 27 and the diffusely reflecting element 30 both correspond to a "diffusion element" described in the appended claims. Therefore, the light source device 2A according to the present embodiment has two diffusion elements.

In the light source device 2A, the array light source 21, the collimator optical system 22, the afocal optical system 23, the homogenizer optical system 24, the superimposing optical system 41, the light intensity control element 40, the collimator optical system 42, the first wave plate 28a, the optical element 25A, the second wave plate 28b, the second light collection optical system 29, and the diffusely reflecting element 30 are disposed in series on an optical axis ax1.

In the light source device 2A, the wavelength conversion element 27, the first light collection optical system 26, the optical element 25A, the integrator optical system 31, the polarization conversion element 32, and the superimposing lens 33a are disposed in series on an optical axis ax2. The optical axis ax1 and the optical axis ax2 are located in the same plane, and are perpendicular to each other. The optical axis ax2 corresponds to the illumination light axis of the illumination device 2.

The array light source 21 is provided with a plurality of semiconductor lasers (light sources) 21a. The plurality of semiconductor lasers 21a is disposed in an array in a plane perpendicular to the optical axis ax1. The semiconductor lasers 21a emit, for example, a blue pencil BL (e.g., laser beams with a peak wavelength of 460 nm). The array light source 21 emits the pencil BL consisting of a plurality of light beams.

The pencil BL emitted from the array light source 21 enters the collimator optical system 22. The collimator optical system 22 converts the pencil BL emitted from the array light source 21 into parallel light. The collimator optical system 22 is formed of, for example, a plurality of collimator lenses 22a for laser arranged in an array. The collimator lenses 22a for laser are disposed so as to correspond respectively to the semiconductor lasers 21a.

The pencil BL having been transmitted through the collimator optical system 22 enters the afocal optical system 23. The afocal optical system 23 adjusts the light beam diameter of the pencil BL. The afocal optical system 23 is formed of, for example, a convex lens 23a and a concave lens 23b.

The pencil BL having been transmitted through the afocal optical system 23 enters the homogenizer optical system 24. The homogenizer optical system 24 homogenizes the light intensity distribution of the pencil BL emitted from the array light source 21.

The homogenizer optical system 24 has a first multi-lens array 24a and a second multi-lens array 24b. The second multi-lens array 24b is located in the posterior stage of the first multi-lens array 24a. In the homogenizer optical system 24, the pencil BL is transmitted through the first multi-lens array 24a, and is then transmitted through the second multi-lens array 24b.

The first multi-lens array 24a has a configuration in which a plurality of first lenses 24a1 is arranged in a matrix having a plurality of rows and a plurality of columns in a plane perpendicular to the optical axis ax1. The first multi-lens array 24a functions as a light beam dividing element for dividing the light emitted from the afocal optical system 23 into a plurality of partial light beams.

The second multi-lens array 24b has a configuration in which a plurality of second lenses 24b1 is arranged in a matrix having a plurality of rows and a plurality of columns in a plane perpendicular to the optical axis ax1 similarly to the first multi-lens array 24a. The second multi-lens array 24b has a function of forming an image of the first lenses 24a1 of the first multi-lens array 24a in an opening part 40b in cooperation with the superimposing optical system 41 in the posterior stage.

In the homogenizer optical system 24, the first lenses 24a1 of the first multi-lens array 24a and the second lenses 24b1 of the second multi-lens array 24b correspond one-to-one to each other, respectively. In other words, the first multi-lens array 24a and the second multi-lens array 24b respectively have the plurality of first lenses 24a1 and the plurality of second lenses 24b1 corresponding one-to-one to each other. Therefore, the number of the first lenses 24a1 and the number of the second lenses 24b1 are equal to each other. Further, each of the first lenses 24a1 overlaps corresponding one of the second lenses 24b1 viewed from the direction parallel to the optical axis ax1. The light emitted from one of the first lenses 24a1 enters corresponding one of the second lenses 24b1.

The pencil BL having been emitted from the homogenizer optical system 24 enters the superimposing optical system 41. Specifically, the superimposing optical system 41 is disposed between the homogenizer optical system and the light intensity control element 40. The superimposing optical system 41 is formed of, for example, a superimposing lens 41a. The superimposing optical system of the present embodiment is formed of the single superimposing lens 41a, but the superimposing optical system 41 can also be formed of a plurality of lenses arranged on the optical axis ax1.

The superimposing optical system 41 superimposing a plurality of light beams emitted from the homogenizer optical system 24 to form a superimposed area CA1. The superimposed area CA1 is disposed in the opening part 40b of the light intensity control element 40 in the posterior stage. The superimposing optical system 41 is an aspherical lens. Specifically, the superimposing optical system 41 has an area formed of an aspheric surface (e.g., a free-form surface). By using the aspherical lens as the superimposing optical system 41, the degree of design freedom is enhanced. Therefore, it is possible not only to simply superimpose the light beams, but also to freely set the distribution in the superimposed area CA1. Therefore, it is possible to form the superimposed area CA1 having a top-hat distribution in the opening part 40b of the light intensity control element using the superimposing optical system 41.

The pencil BL having been emitted from the superimposing optical system 41 enters the light intensity control element 40. The light intensity control element 40 controls the light intensity of the light having been emitted from the homogenizer optical system 24 and then collected by the superimposing optical system 41.

The light intensity control element 40 has a main body part 40a having a plate-like shape and provided with the opening part 40b. The light intensity control element 40 controls the light intensity by blocking a part of the light with the main body part 40a and transmitting a part of the light through the opening part 40b, wherein the main body part 40a is formed of a color and a material absorbing the light. The main body part 40a absorbs the incident light to thereby block the light.

It should be noted that more detailed functions and advantages of the light intensity control element 40 will be described in a posterior section based on FIG. 3.

The pencil BL having been transmitted through the light intensity control element 40 enters the collimator optical system 42. The collimator optical system 42 is located between the light intensity control element 40 and the first light collection optical system 26. The collimator optical system 42 is formed of, for example, a collimator lens 42a. The collimator optical system 42 of the present embodiment is formed of the single collimator lens 42a, but the collimator optical system 42 can also be formed of a plurality of lenses arranged on the optical axis ax1. The collimator optical system 42 collimates or roughly collimates the light which has been collected by the superimposing optical system 41, and then diffused after transmitted through the light intensity control element 40.

The pencil BL having been transmitted through the collimator optical system 42 enters the first wave plate 28a. The first wave plate 28a is, for example, a half-wave plate having an optical axis arranged to be able to rotate around the optical axis ax1. The pencil BL is linearly polarized light. By appropriately setting the rotational angle of the first wave plate 28a, it is possible to set the pencil BL having been transmitted through the first wave plate 28a to the light beam including the S-polarization component and the P-polarization component with respect to the polarization separation element 50A at a predetermined ratio.

The pencil BL, which includes the S-polarization component and the P-polarization component by passing through the first wave plate 28a, enters the optical element 25A. The optical element 25A is formed of, for example, a dichroic prism having wavelength selectivity. The dichroic prism has a tilted surface K having an angle of 45° with the optical axis ax1. The tilted surface K also has an angle of 45° with the optical axis ax2.

The tilted surface K is provided with the polarization separation element 50A having wavelength selectivity. The polarization separation element 50A has a polarization separation function of splitting the pencil BL into a pencil BLs as the S-polarization component with respect to the polarization separation element 50A and a pencil BLp as the P-polarization component. Specifically, the polarization separation element 50A reflects the pencil BLs as the S-polarization component, and transmits the pencil BLp as the P-polarization component.

Further, the polarization separation element 50A has a color separation function of transmitting fluorescence YL different in wavelength band from the pencil BL irrespective of the polarization state of the fluorescence YL.

The pencil BLs as the S-polarized light having been emitted from the polarization separation element 50A enters the first light collection optical system 26. The first light collection optical system 26 converges the pencil BLs toward a phosphor layer 34 as excitation light. In other words, the first light collection optical system 26 collects the light having been transmitted through the light intensity control element 40 and then having been processed by the polarization separation element 50A.

In the present embodiment, the first light collection optical system 26 is formed of, for example, a first lens 26a and a second lens 26b. The pencil BLs having been converged by the first light collection optical system enters the wavelength conversion element 27 in a converged state. The first light collection optical system 26 forms a light collection area CA2 on the surface of the phosphor layer 34 of the wavelength conversion element 27.

The wavelength conversion element 27 has the phosphor layer (a diffusion layer) 34 for diffusing the incident light, a support member 35 for supporting the phosphor layer 34, and a bonding layer 36 for bonding the phosphor layer 34 and the support member 35.

The phosphor layer 34 is excited by the pencil BLs, and emits the fluorescence (yellow light) YL having a peak wavelength in a wavelength band of, for example, 500 through 700 nm. The phosphor layer 34 also functions as a diffusion layer. In other words, the phosphor layer 34 emits the Lambert diffuse fluorescence YL.

The bonding layer 36 is located between a reverse surface 34b of the phosphor layer 34 and the support member 35 to fix the phosphor layer 34 and the support member 35 to each other, wherein the reverse surface 34b is located on the opposite side to the side which the pencil BLs enters. The bonding layer 36 is disposed so as to cover the whole of the reverse surface 34b in order to tightly hold the phosphor layer 34. Therefore, the bonding layer 36 of the present embodiment partially runs off outside the phosphor layer 34.

As the support member 35, what is excellent in thermal conductivity is preferable, and a plate-like member made of metal is used in the present embodiment. In the present embodiment, a copper plate is used as the support member 35. It should be noted that it is also possible to use aluminum as the material of the support member 35.

The fluorescence YL emitted from the phosphor layer 34 is non-polarized light. The fluorescence YL passes through the first light collection optical system 26, and then enters the polarization separation element 50A. Then the fluorescence YL proceeds from the polarization separation element 50A toward the integrator optical system 31.

Meanwhile, the pencil BLp as the P-polarized light having been emitted from the polarization separation element 50A is converted by the second wave plate 28b into blue light BLc1 as clockwise circularly polarized light, and then enters the second light collection optical system 29. The second wave plate 28b is formed of a quarter-wave plate.

The second light collection optical system 29 is formed of, for example, a lens 29a, and makes the blue light BLc1 enter the diffusely reflecting element 30 in a converged state. In other words, the second light collection optical system 29 collects the light having been transmitted through the light intensity control element 40 and then having been processed by the polarization separation element 50A. The second light collection optical system 29 forms a light collection area CA3 on the surface of a diffusely reflecting layer 30a of the diffusely reflecting element 30.

The diffusely reflecting element 30 has the diffusely reflecting layer (diffusion layer) 30a. The blue light BLc1 having been converged by the second light collection optical system 29 enters the diffusely reflecting layer 30a of the diffusely reflecting element 30. The diffusely reflecting layer 30a diffusely reflects the incident blue light BLc1 toward the polarization separation element 50A. As the diffusely reflecting layer 30a, it is preferable to use a layer which does not disturb the polarization state while causing the Lambertian reflection of the blue light BLc1.

Hereinafter, the light diffusely reflected by the diffusely reflecting element 30 is referred to as blue light BLc2. According to the present embodiment, by diffusely reflecting the blue light BLc1, there can be obtained the blue light BLc2 having a roughly homogenous illuminance distribution. The blue light BLc1 as the clockwise circularly polarized light is reflected as the blue light BLc2 as counterclockwise circularly polarized light.

The blue light BLc2 is converted by the second light collection optical system 29 into parallel light, and is then transmitted though the second wave plate 28b once again to be converted into the blue light BLs1 as the S-polarized light. The blue light BLs1 is reflected by the polarization separation element 50A toward the integrator optical system 31.

The blue light BLs1 and the fluorescence YL are emitted from the polarization separation element 50A toward the respective directions the same as each other, and thus, there is generated the white illumination light (white light) WL having the blue light BLs1 and the fluorescence (the yellow light) YL mixed with each other.

The illumination light WL is emitted toward the integrator optical system 31. The integrator optical system 31 is constituted by, for example, a lens array 31a, and a lens array 31b. The lens arrays 31a, 31b are each formed of what has a plurality of small lenses arranged in an array.

The illumination light WL having been transmitted through the integrator optical system 31 enters the polarization conversion element 32. The polarization conversion element 32 is constituted by a polarization separation film and a wave plate. The polarization conversion element 32 converts the illumination light WL including the fluorescence YL as the non-polarized light into linearly polarized light.

The illumination light WL having been transmitted through the polarization conversion element 32 enters the superimposing lens 33a. The superimposing lens 33a homogenizes the distribution of the illuminance due to the illumination light WL in the illumination target area in cooperation with the integrator optical system 31. The illumination device 2 emits the illumination light WL in such a manner as described above.

Figure 3:
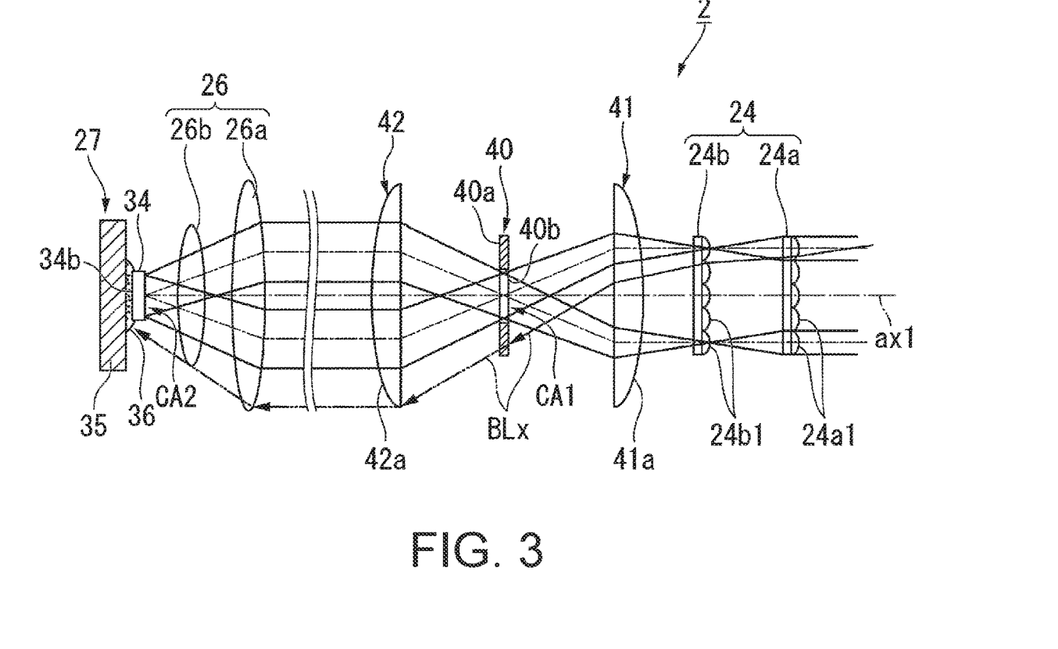
FIG. 3 is a schematic diagram showing a light path from a homogenizer optical system to a wavelength conversion element according to the first embodiment.

Then, the light paths of the light entering the light intensity control element 40 and the light having been transmitted through the light intensity control element 40 will more specifically be described based on FIG. 3.

FIG. 3 is a schematic diagram showing a light path from the homogenizer optical system 24 to the wavelength conversion element 27. In FIG. 3, the polarization separation element 50A (the optical element 25A) is omitted, and the constituents on the light path are shown so as to be arranged on the same axis. Further, in FIG. 3, for the sake of simplification, only the light paths of the light having entered the first lenses 24a1 in the uppermost part and the lowermost part are illustrated out of the light having entered the plurality of first lenses 24a1.

As shown in FIG. 3, the light having emitted from one of the first lenses 24a1 of the first multi-lens array 24a enters the corresponding one of the second lenses 24b1 of the second multi-lens array 24b to thereby finally enter the phosphor layer 34 of the wavelength conversion element 27.

On the other hand, as shown in FIG. 3, due to the variation in the implementation accuracy and so on, a part (hereinafter referred to as stray light BLx) of the light having been emitted from the first lens 24a1 enters the second lens 24b1 not corresponding to that first lens 24a1. As described in FIG. 3 with a dashed-two dotted line, in the case in which the light intensity control element 40 is absent, the stray light BLx draws the light path passing through the first light collection optical system 26 and then entering the area other than the incident area of the blue pencil BLs in the phosphor layer 34. As shown in the drawing, there is a possibility that the stray light BLx having entered the wavelength conversion element 27 (the diffusion element) enters the bonding layer 36 formed outside the phosphor layer 34 in a planar view to incur the deterioration of the bonding layer 36. Further, there is a possibility that a part of the stray light having entered the outside of the phosphor layer 34 is reflected by the support member 35, and then enters another member to incur the deterioration of that member.

According to the present embodiment, the light intensity control element 40 is disposed in the posterior stage of the homogenizer optical system 24, and the anterior stage of the first light collection optical system 26. In other words, the light intensity control element 40 is disposed between the homogenizer optical system 24 and the first light collection optical system 26. In other words, the light intensity control element 40 is disposed between the superimposing optical system 41 and the collimator optical system 42. Thus, the stray light BLx generated in the homogenizing process of the light by the homogenizer optical system 24 can be removed by the light intensity control element 40 so as not to enter the area other than the area which the blue pencil BL enters, in particular the bonding layer 36, in the phosphor layer 34. Further, it is possible to prevent the stray light BLx from entering other members using the light intensity control element 40. Thus, it is possible to prevent the damage and the deterioration of the other members caused by the stray light BLx. Therefore, according to the present embodiment, it is possible to provide the light source device 2A and the projector 1 improved in reliability by blocking the stray light BLx.

In general, it is preferable to dispose the first light collection optical system 26 and the phosphor layer of the wavelength conversion element 27 as close as possible. In the present embodiment, in order to make the light emitted from the phosphor layer 34 enter the first light collection optical system 26 as much as possible, it is preferable to set the gap between the first light collection optical system 26 and the phosphor layer 34 in a range of 1 mm through 2 mm. Therefore, it is difficult to dispose the light intensity control element 40 between the first light collection optical system 26 and the phosphor layer 34. According to the configuration described above, by disposing the light intensity control element 40 between the homogenizer optical system 24 and the first light collection optical system 26, it is possible to prevent the light from entering an area other than the area which the blue pencil BL enters in the phosphor layer 34 while narrowing the gap between the first light collecting optical system 26 and the phosphor layer 34.

As shown in FIG. 3, in the present embodiment, the light intensity control element 40 has the main body part 40a and the opening part 40b. The opening part 40b is provided to the main body part 40a. Further, the superimposing optical system 41 superimposes the light emitted from the homogenizer optical system 24 in the opening part 40b of the light intensity control element 40. Thus, it is possible to block the stray light BLx which is going to enter an area other than the area which the blue pencil BL enters of the phosphor layer 34 using the main body part 40a outside the opening part 40b to thereby prevent the light from entering the area other than the area which the blue pencil BL enters of the phosphor layer 34.

It is preferable for the planar view shape of the opening part 40b of the light intensity control element 40 to have a rough similarity relationship with the planar view shape of the phosphor layer 34. Thus, it is possible to enhance the efficiency of the light transmitted through the opening part 40b without enlarging the planar view dimensions of the phosphor layer 34.

Further, it is preferable for the size of the superimposed area CA1 where the light is superimposed in the superimposing optical system 41 to be larger than the size of the light collection area CA2 where the light is converged on the surface of the phosphor layer 34 by the first light collection optical system 26. For example, the planar view dimension of the phosphor layer 34 corresponds to a rectangular shape, roughly 1 mm through 2 mm on a side. It is difficult to accurately form the light intensity control element 40 having the opening part 40b with the same dimensions as those of such a phosphor layer 34, and accurately dispose the light intensity control element 40. By making the size of the superimposed area CA1 of the superimposing optical system 41 larger than the size of the light collection area CA2 of the first light collection optical system 26, it is possible to make the size in the planar view of the opening part 40b larger than the size in the planar view of the phosphor layer 34. Therefore, it is possible to blunt the influence of the dimensional accuracy and the positional accuracy of the opening part 40b to enhance the efficiency of the light as a result.

It should be noted that the configuration of making the size of the superimposed area CA1 of the superimposing optical system 41 larger than the size of the light collection area CA2 of the first light collection optical system 26 can be realized by appropriately setting the focal distances of the superimposing optical system 41 and the first light collection optical system 26.

It should be noted that the superimposing optical system 41 forms the superimposed area CA1 having the similarity shape to the planar view shape of the first lens 24a1 of the first multi-lens array 24a. Therefore, in the present embodiment, the planar view shapes of the first lens 24a1, the opening part 40b, and the phosphor layer 34 are similarity shapes to each other.

Here, the focal distance of the first lens 24a1 of the first multi-lens array 24a is defined as f1, and the focal distance of the second lens 24b1 of the second multi-lens array 24b is defined as f2. Further, the dimension along one direction of the first lens 24a1 is defined as x1. In this case, the dimension X along the one direction of the superimposed area CA1 is expressed by Formula 1 below.

$$X = x1 \times (f2/f1) \quad \text{(Formula 1)}$$

It is preferable to make the dimension along the one direction of the opening part 40b coincide with the X expressed by Formula 1. That is, by making the superimposed area CA1 and the opening part 40b coincide with each other, it is possible to surely block the light failing to enter the superimposed area CA1, and at the same time, prevent the light normally passing through the superimposed area CA1 from being blocked.

It is preferable for the opening part 40b of the light intensity control element 40 and the phosphor layer 34 of the wavelength conversion element 27 to be arranged to have a conjugate relation. By adopting such an arrangement, substantially the same images are formed in the opening part 40b and the phosphor layer 34 as the superimposed area CA1 and the light collection area CA2, respectively. Thus, it is possible to prevent the light which should enter the phosphor layer 34 from being removed by the main body part 40a. Further, it is also possible to prevent the stray light BLx which should be blocked by the main body part 40a from being transmitted through the opening part 40b. It should be noted that it is preferable for the opening part 40b to be arranged so as to have a conjugate relation with the first multi-lens array 24a in order to improve the efficiency of the light. Therefore, in the present embodiment, the first multi-lens array 24a, the opening part 40b and the phosphor layer 34 are arranged so as to have the conjugate relation with each other.

In the present embodiment, the collimator optical system 42 is disposed between the light intensity control element 40 and the first light collection optical system 26. The collimator optical system 42 collimates the light converged by the superimposing optical system 41. It should be noted that it is also possible for the collimator optical system 42 to roughly collimate the light converged by the superimposing optical system 41. By collimating or roughly collimating the light by the collimator optical system 42, it is possible to reduce the sizes of the polarization separation element 50A and the first collection optical system 26 located in the posterior stage of the collimator optical system 42.

It should be noted here that roughly collimating the light means converting the light passing therethrough into roughly parallel light. Further, roughly parallel light means the light in the state in which the angle formed between the light beams constituting the light is sufficiently small. In the present embodiment, the collimator optical system 42 converts the light passing through the collimator optical system 42 into the light parallel to the light axis.

Defining the focal distance of the superimposing optical system 41 as F1, and the focal distance of the collimator optical system 42 as F2, it is preferable for the focal distances F1, F2 to satisfy the relationship represented by Formula 2 below.

$$F1 \geq F2 \quad \text{(Formula 2)}$$

In other words, it is preferable to make the focal distance F2 of the collimator optical system 42 shorter than the focal distance F1 of the superimposing optical system 41.

In the case of satisfying Formula 2, it is possible to make the width of the light beam emitted from the collimator optical system 42 and then entering the first light collection optical system 26 narrower compared to the width of the light beam entering the superimposing optical system 41. As a result, it is possible to reduce the size of the first light collection optical system 26.

The light source device 2A according to the present embodiment has the two diffusion elements (the wavelength conversion element 27 and the diffusely reflecting element 30) which the light emitted from the semiconductor laser (the light source) 21a enters. Here, the function and the advantage related to the wavelength conversion element 27 as one of the diffusion elements are described based on FIG. 3. In the present embodiment, such function and advantage can also be exerted with respect to the diffusely reflecting element 30 as the other of the diffusion elements. In this case, the second light collection optical system 29 functions corresponding to the first light collection optical system 26.

Specifically, in the present embodiment, the light intensity control element 40 is disposed in the posterior stage of the homogenizer optical system 24, and the anterior stage of the second light collection optical system 29. The light intensity control element 40 is disposed between the homogenizer optical system 24 and the first light collection optical system 26. In other words, the light intensity control element 40 is disposed between the superimposing optical system 41 and the collimator optical system 42. Thus, the stray light BLx generated in the homogenizing process of the light by the homogenizer optical system 24 can be removed by the light intensity control element 40 so as not to enter the area other than the area which the blue pencil BL enters in the diffusely reflecting layer 30a.

Therefore, it is possible for the light source device 2A according to the present embodiment to remove the stray light BLx which is going to enter the area other than the area which the blue pencil BL enters of each of the diffusion layers (the phosphor layer 34 and the diffusely reflecting layer 30a) of the two diffusion elements (the wavelength conversion element 27 and the diffusely reflecting element 30) using the single light intensity control element 40.

It should be noted that regarding the positional relationship (the conjugate relation) and the relationship in the shape (the similarity relationship) between the diffusely reflecting element 30 and the opening part 40b of the light intensity control element 40, by adopting substantially the same configuration as that of the wavelength conversion element 27, substantially the same advantage can be exerted.

Specifically, by making the planar view shape of the diffusely reflecting layer 30a of the diffusely reflecting element 30 have a rough similarity relationship with the planar view shape of the opening part 40b of the light intensity control element 40, it is possible to improve the efficiency of the light having passed through the opening part 40b without enlarging the planar view dimensions of the diffusely reflecting layer 30a.

Further, it is preferable for the size of the superimposed area CA1 where the light is superimposed in the superimposing optical system 41 to be larger than the size of the light collection area CA3 where the light is converged on the surface of the diffusely reflecting layer 30a by the second light collection optical system 29. It is difficult to accurately form the light intensity control element 40 having the opening part 40b with the same dimensions as those of the diffusely reflecting layer 30a, and accurately dispose the light intensity control element 40. By making the size of the superimposed area CA1 of the superimposing optical system 41 larger than the size of the light collection area CA3 of the second light collection optical system 29, it is possible to make the size in the planar view of the opening part 40b larger than the size in the planar view of the diffusely reflecting layer 30a. Therefore, it is possible to blunt the influence of the dimensional accuracy and the positional accuracy of the opening part 40b to enhance the efficiency of the light as a result.

In addition, it is preferable for the diffusely reflecting layer 30a and the opening part 40b of the light intensity control element 40 to be arranged so as to have a conjugate relation. By adopting such an arrangement, substantially the same images are formed in the opening part 40b and the diffusely reflecting layer 30a as the superimposed area CA1 and the light collection area CA3, respectively. Thus, it is possible to prevent the light which should enter the diffusely reflecting layer 30a from being removed by the main body part 40a. Further, it is also possible to prevent the stray light BLx which should be blocked by the main body part 40a from being transmitted through the opening part 40b.

In the present embodiment, since the main body part 40a of the light intensity control element 40 absorbs the light having entered the main body part 40a, it is possible to prevent the stray light BLx blocked by the light intensity control element 40 from entering other members of the light source device 2A to exert influence such as a damage and deterioration.

Modified Examples

Figure 4:
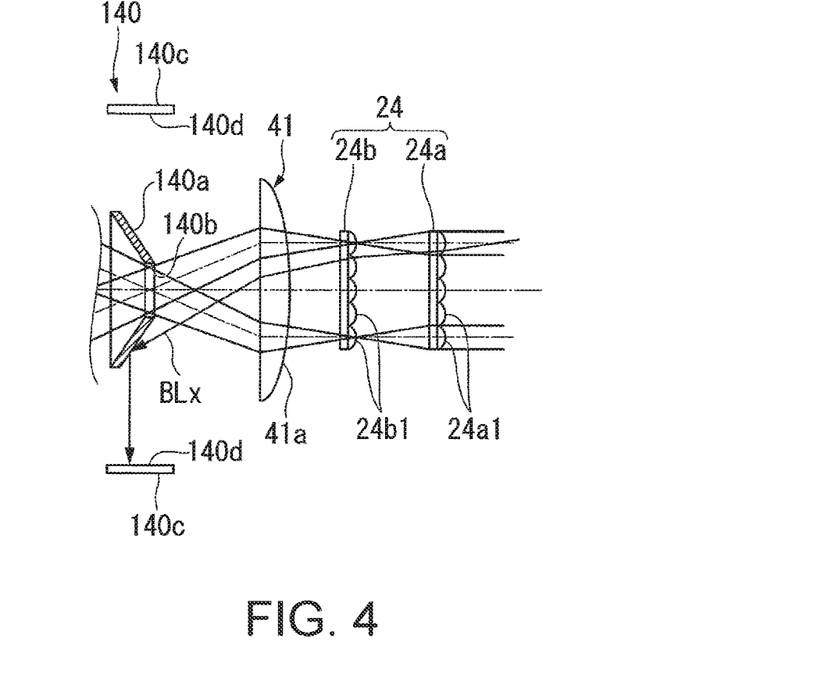
FIG. 4 is a schematic diagram showing a light intensity control element of a modified example of the first embodiment, and a light path of the light entering the light intensity control element.

FIG. 4 is a schematic diagram showing a light intensity control element 140 and a light path of light entering the light intensity control element 140 of a modified example which can be adopted to the light source device 2A according to the present embodiment.

The light intensity control element 140 of the present modified example has a main body part 140a provided with an opening part 140b, and a light receiving body 140c. Similarly to the embodiment described above, the light intensity control element 140 of the present modified example blocks a part of the light with the main body part 140a and transmits a part of the light through the opening part 140b to thereby control the light intensity.

The main body part 140a of the present modified example has a truncated quadrangular pyramid shape with a bottom side and a top side opened. The height direction (i.e., a direction perpendicular to the bottom side and the top side of the truncated quadrangular pyramid shape) of the truncated quadrangular pyramid coincides with the optical axis ax1. The opening part 140b of the main body part 140a is disposed so as to correspond to the top side of the truncated quadrangular pyramid. Each side of the main body part 140a is disposed so as to be tilted with respect to the optical axis ax1. The main body part 140a reflects the stray light BLx having entered the main body part 140a toward the direction of getting away from the optical axis ax1.

The light receiving body 140c has a rectangular cylindrical shape with a bottom side and a top side opened. The light receiving body 140c surrounds the periphery of the main body part 140a. In other words, the main body part 140a is disposed inside the light receiving body 140c having the rectangular cylindrical shape. The light receiving body 140c has a light receiving surface 140d facing inward (i.e., the optical axis ax1 side). The light receiving body 140c absorbs the stray light BLx having been reflected by the main body part 140a with the light receiving surface 140d. Thus, it is possible to prevent the stray light BLx from entering other members of the light source device 2A to exert influence such as a damage and deterioration.

Second Embodiment

Figure 5:
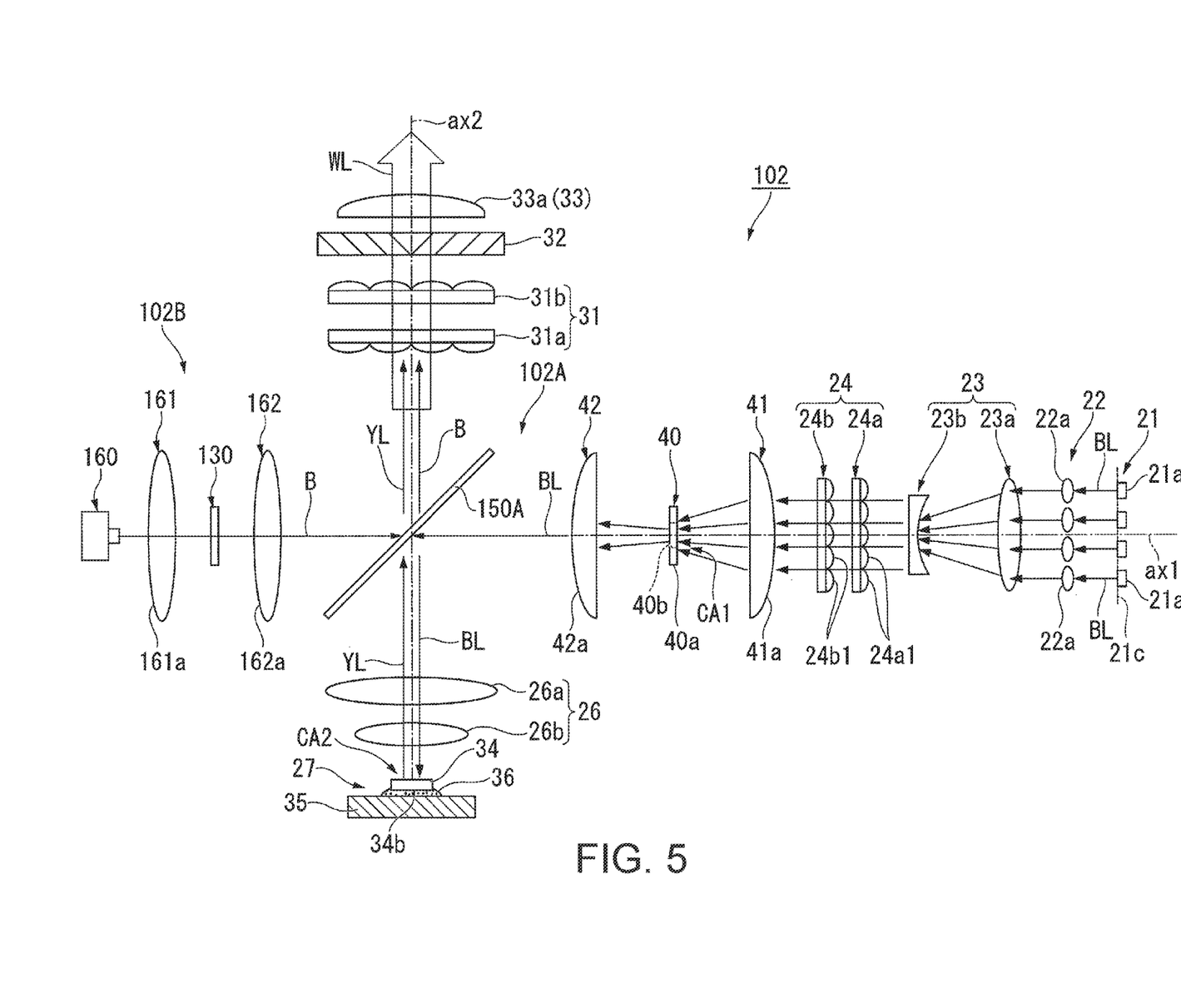
FIG. 5 is a diagram showing a schematic configuration of an illumination device according to a second embodiment of the invention.

FIG. 5 is a diagram showing a schematic configuration of an illumination device 102 according to a second embodiment. Compared to the first embodiment, the illumination device 102 according to the second embodiment is mainly different in the configuration of generating the blue light B out of the fluorescence (the yellow light) YL and the blue light B constituting the white light WL.

It should be noted that the constituents having the same configurations as in the embodiment described above are denoted by the same reference symbols, and the description thereof will be omitted.

As shown in FIG. 5, the illumination device 102 has a first light source device 102A and a second light source device 102B. Further, similarly to the first embodiment, the illumination device 102 is provided with the integrator optical system 31, the polarization conversion element 32, and the superimposing lens 33a.

The first light source device 102A has the array light source 21, the collimator optical system 22, the afocal optical system 23, the homogenizer optical system 24, the superimposing optical system 41, the light intensity control element 40, the collimator optical system 42, a dichroic mirror 150A, the first light collection optical system (the light collection optical system) 26, and the wavelength conversion element (the diffusion element) 27.

The dichroic mirror 150A is disposed in the light path from the collimator optical system 42 to the first light collection optical system 26 so as to cross each of the optical axis ax1 and the optical axis ax2 at an angle of 45°. The dichroic mirror 150A reflects the blue light B, and transmits the yellow fluorescence YL including the red light and the green light.

The first light source device 102A homogenizes the light emitted from the semiconductor laser 21a using the homogenizer optical system 24, blocks a part of the light using the light intensity control element 40, collects the rest of the light using the first light collection optical system 26, and then makes the light thus collected enter the wavelength conversion element 27. The phosphor layer 34 of the wavelength conversion element 27 is excited by the pencil BL to emit the fluorescence (yellow light) YL. The fluorescence YL emitted from the phosphor layer 34 is transmitted through the dichroic mirror 150A, and then proceeds toward the integrator optical system 31.

According to the first light source device 102A of the present embodiment, similarly to the first embodiment, the light intensity control element 40 is disposed in the posterior stage of the homogenizer optical system 24 and in the anterior stage of the first light collection optical system 26. In other words, the light intensity control element 40 is disposed between the homogenizer optical system 24 and the first light collection optical system 26. In other words, the light intensity control element 40 is disposed between the superimposing optical system 41 and the collimator optical system 42. Thus, the stray light generated in the homogenizing process of the light by the homogenizer optical system 24 can be removed by the light intensity control element 40 so as not to enter the area other than the area which the blue pencil BL enters, in particular the bonding layer 36, in the phosphor layer 34.

The second light source device 102B is provided with a semiconductor laser 160, a second light collection optical system 161, a diffusion plate (a diffusion element) 130, and a collimator optical system 162.

The semiconductor laser 160 emits blue light B (e.g., a laser beam with a peak wavelength of 460 nm).

The second light collection optical system 161 is provided with a second condenser lens 161a. The second light collection optical system 161 collects the blue light B from the blue-color semiconductor laser 160 on the diffusion plate 130. The second condenser lens 161a is formed of a convex lens.

The diffusion plate 130 transmits the blue light B from the semiconductor laser 160 while diffusing the blue light B to obtain the light distribution similar to the light distribution of the fluorescence YL emitted from the phosphor layer 34. As the diffusion plate 130, there can be used, for example, obscured glass made of optical glass.

The collimator optical system 162 is provided with a collimator lens 162a, and roughly collimates the light emitted from the diffusion plate 130.

The blue light B from the second light source device 102B is reflected by the dichroic mirror 150A, then combined with the fluorescence YL, which has been emitted from the phosphor layer 34 and then transmitted through the dichroic mirror 150A, to turn to the white light WL. The white light WL enters the integrator optical system 31.

According to the present embodiment, the light intensity control element 40 is disposed in the light path of the light for generating the fluorescence YL out of the light constituting the white light WL. Specifically, the light intensity control element 40 is disposed in the path from the laser source 21a to the phosphor layer 34 of the wavelength conversion element 27, and between the homogenizer optical system 24 and the first light collection optical system 26. Thus, it is possible to remove the stray light generated in the homogenizing process of the light by the homogenizer optical system 24 using the light intensity control element 40. As a result, in the phosphor layer 34, the stray light can be prevented from entering the area other than the area which the blue pencil BL enters. Therefore, it is possible to prevent the stray light from entering the bonding layer 36 disposed on the periphery of the phosphor layer 34, and since the wavelength conversion element 27 is fixed by the bonding layer 36, it is possible to prevent the detachment of the wavelength conversion element 27.

On the other hand, in the present embodiment, the light intensity control element 40 is not disposed in the light path of the light for generating the blue light B. Therefore, the light entering the diffusion plate (the diffusion element) 130 is not the light having passed through the light intensity control element 40. As described above, regarding the illumination device 102 having a plurality of diffusion elements, it is possible to dispose the light intensity control element 40 in the light path of the light entering just one of the diffusion elements.

It should be noted that in the present embodiment, it is also possible to adopt a configuration in which the homogenizer optical system and the light intensity control element are disposed in the anterior stage of the diffusion plate 130 to thereby make the light enter only a desired area of the diffusion plate 130.

Further, regarding the present embodiment, it is also possible to dispose the diffusely reflecting plate (the diffusely reflecting element 30 shown in FIG. 2) of the first embodiment instead of the wavelength conversion element 27. In this case, by providing the configuration of generating the fluorescence YL in the second light source device 102B, it is possible to generate the white light WL.

Although the variety of embodiments of the invention and the modified examples thereof are hereinabove described, each of the constituents and the combinations of the constituents in each the embodiments and the modified examples are illustrative only, and modifications such as addition, omission, or substitution of the constituents can be made within the scope or the spirit of the invention. Further, the scope of the invention is not limited by the embodiments.

For example, in the embodiments described above, there is described the case in which the light intensity control element 40, 140 includes the single main body part 40a, 140a. However, the main body part can also be constituted by a plurality of members arranged along the optical axis ax1 direction. For example, it is also possible to adopt a structure having a first main body part for blocking the light in the right and left areas viewed from the optical axis ax1 direction, and a second main body part which is located posterior in the optical axis direction to the first main body part, and blocks the light in the upper and lower areas. In this case, the first main body part and the second main body part overlap each other viewed from the optical axis ax1 direction to thereby form an opening part at the center thereof. Specifically, it is sufficient for the opening part to be an area for transmitting the light surrounded by the main body parts when viewed from the optical axis direction.

Further, in the embodiments described above, there is described the case in which the superimposing optical system 41 is disposed in the anterior stage of the light intensity control element 40, 140 to superimpose the light on the opening part 40b, 140b. However, it is not necessary to have the superimposing optical system 41. In this case, it is possible to adopt a configuration of blocking a part of the light using a light intensity control element provided with the same number of opening parts as the number of the first or second lenses corresponding to the plurality of partial light beams divided into by the homogenizer optical system 24.

Further, there is cited the stationary type as an example of the diffusion elements (the wavelength conversion element 27 and the diffusely reflecting element 30) in the embodiments described above, but it is also possible to adopt a rotary type in which the diffusion elements can rotate.

Further, although in the embodiments described above, there is illustrated the projector 1 provided with the three light modulation devices 4R, 4G, and 4B, the invention can also be applied to a projector for displaying a color picture with a single light modulation device. Further, a digital mirror device can also be used as the light modulation device.

Further, although in the embodiments described above, there is described the example of installing the illumination device according to the invention in the projector, the invention is not limited to this example. The illumination device according to the invention can also be applied to lighting equipment, a headlight of a vehicle, and so on.

The entire disclosure of Japanese Patent Application No. 2017-148903, filed on Aug. 1, 2017 is expressly incorporated by reference herein.

What is claimed is:

1. A light source device comprising:
a light source;
a homogenizer optical system adapted to homogenize light emitted from the light source, the homogenizer including:
   a first multi-lens array having a plurality of first lenses which the light emitted from the light source enters; and
   a second multi-lens array having a plurality of second lenses each of which light that has transmitted through a corresponding one of the first lenses enters;
a light blocker adapted to block a part of light emitted from the homogenizer optical system;
a light collection optical system adapted to converge light that has transmitted through the light blocker; and
a diffusion element which light converged by the light collection optical system enters.

2. The light source device according to claim 1, wherein the diffusion element has a diffusion layer adapted to diffuse incident light, a support member adapted to support the diffusion layer, and a bonding layer adapted to bond the diffusion layer and the support member to each other.

3. The light source device according to claim 1, further comprising:
a main body part of the light blocker provided with an opening part, the light blocker blocking the part of the light with the main body part while transmitting another part of the light through the opening part; and
a superimposing optical system located between the homogenizer optical system and the light blocker and adapted to superimpose the light emitted from the homogenizer optical system on the opening part of the light blocker.

4. The light source device according to claim 3, further comprising:
a collimator optical system located between the light blocker and the light collection optical system and adapted to collimate the light that has transmitted through the light blocker.

5. The light source device according to claim 3, wherein the superimposing optical system is formed of an aspherical lens.

6. The light source device according to claim 3, wherein the main body part of the light blocker absorbs the incident light.

7. The light source device according to claim 4, wherein the main body part of the light blocker reflects the incident light, and
the light blocker has a light receiving body adapted to absorb the light reflected by the main body part.

8. The light source device according to claim 1, wherein the diffusion element is formed of a wavelength conversion element adapted to convert a wavelength of the light emitted from the light source.

9. A projector comprising:
the light source device according to claim 1;
a light modulation device adapted to modulate light emitted from the light source device in accordance with image information to thereby form image light; and
a projection optical system adapted to project the image light.

10. A projector comprising:
the light source device according to claim 2;
a light modulation device adapted to modulate light emitted from the light source device in accordance with image information to thereby form image light; and
a projection optical system adapted to project the image light.

11. A projector comprising:
the light source device according to claim 3;
a light modulation device adapted to modulate light emitted from the light source device in accordance with image information to thereby form image light; and
a projection optical system adapted to project the image light.

12. A projector comprising:
the light source device according to claim 4;
a light modulation device adapted to modulate light emitted from the light source device in accordance with image information to thereby form image light; and
a projection optical system adapted to project the image light.

13. A projector comprising:
the light source device according to claim 5;
a light modulation device adapted to modulate light emitted from the light source device in accordance with image information to thereby form image light; and
a projection optical system adapted to project the image light.

14. A projector comprising:
the light source device according to claim 6;
a light modulation device adapted to modulate light emitted from the light source device in accordance with image information to thereby form image light; and
a projection optical system adapted to project the image light.

15. A projector comprising:
the light source device according to claim 7;
a light modulation device adapted to modulate light emitted from the light source device in accordance with image information to thereby form image light; and
a projection optical system adapted to project the image light.

16. A projector comprising:
the light source device according to claim 8;
a light modulation device adapted to modulate light emitted from the light source device in accordance with image information to thereby form image light; and
a projection optical system adapted to project the image light.

17. A light source device comprising:
a light source;
a homogenizer optical system adapted to homogenize light emitted from the light source, the homogenizer including:
   a first multi-lens array having a plurality of first lenses which the light emitted from the light source enters; and
   a second multi-lens array having a plurality of second lenses each of which light that has transmitted through a corresponding one of the first lenses enters;
a light intensity control element adapted to control light intensity of light emitted from the homogenizer optical system, the light intensity control element including a main body part provided with an opening part, the light intensity control element blocking a part of the light with the main body part while transmitting a part of the light through the opening part to control the light intensity;

a light collection optical system adapted to converge light that has transmitted through the light intensity control element;

a diffusion element which light converged by the light collection optical system enters;

a superimposing optical system located between the homogenizer optical system and the light intensity control element and adapted to superimpose the light emitted from the homogenizer optical system on the opening part of the light intensity control element; and a collimator optical system located between the light intensity control element and the light collection optical system and adapted to collimate the light that has transmitted through the light intensity control element.

18. The light source device according to claim 17, wherein the diffusion element has a diffusion layer adapted to diffuse incident light, a support member adapted to support the diffusion layer, and a bonding layer adapted to bond the diffusion layer and the support member to each other.

19. The light source device according to claim 17, wherein the diffusion element is formed of a wavelength conversion element adapted to convert a wavelength of the light emitted from the light source.

20. A projector comprising:

the source device according to claim 17;

a light modulation device adapted to modulate light emitted from the light source device in accordance with image information to thereby form image light; and a projection optical system adapted to project the image light.

* * * * *